United States Patent [19]

Simone

[11] Patent Number: 5,720,040
[45] Date of Patent: Feb. 24, 1998

[54] DEVICE FOR ATTACHING A PAIR OF SPECTACLES TO HEADGEAR

[76] Inventor: Nicolas Simone, Cour Des Miracles, Route Du Saleve, F-74560 Monnetier-Mornex, France

[21] Appl. No.: 338,459

[22] PCT Filed: May 11, 1993

[86] PCT No.: PCT/FR93/00452

§ 371 Date: Dec. 21, 1994

§ 102(e) Date: Dec. 21, 1994

[87] PCT Pub. No.: WO93/22946

PCT Pub. Date: Nov. 25, 1993

[30] Foreign Application Priority Data

May 14, 1992 [FR] France ................... 92 06087

[51] Int. Cl.[6] .................................................. A61F 9/02
[52] U.S. Cl. .................................................. 2/10; 2/452
[58] Field of Search ............... 2/6.3, 422, 424, 2/15, 10, 11, 452, 9; 351/155, 158

[56] References Cited

U.S. PATENT DOCUMENTS

| | | |
|---|---|---|
| 1,725,340 | 8/1929 | Castriotis . |
| 2,004,701 | 6/1935 | Livengood .................... 2/10 |
| 2,445,203 | 7/1948 | Bowers ....................... 2/10 |
| 2,761,145 | 9/1956 | Malcom, Jr. . |
| 4,152,051 | 5/1979 | VanTiem et al. ........... 351/155 |
| 4,406,040 | 9/1983 | Cannone . |
| 4,541,125 | 9/1985 | Phillips . |
| 4,636,048 | 1/1987 | Jones . |
| 5,181,139 | 1/1993 | Benitez ..................... 351/155 |
| 5,278,999 | 1/1994 | Brown et al. .............. 351/155 |
| 5,289,592 | 3/1994 | Paivarinta ................. 351/155 |
| 5,412,812 | 5/1995 | Gatchalian ................ 351/155 |

FOREIGN PATENT DOCUMENTS

| | | |
|---|---|---|
| 0321617 | 6/1989 | European Pat. Off. . |
| 66810 | 9/1957 | France . |
| 47456 | 12/1888 | Germany . |
| 121778 | 7/1900 | Germany . |
| 2030546 | 12/1971 | Germany . |

*Primary Examiner*—Michael A. Neas
*Attorney, Agent, or Firm*—Merchant, Gould, Smith, Edell, Welter & Schmidt, P.A.

[57] ABSTRACT

Device for attaching a pair of spectacles or eye protection screen (2) to headgear (1) or to a rigid head band. The device comprises a first upper hinge pin with its axis being substantially horizontal and parallel to the wearer's forehead, said hinge pin being extended by a telescoping arm formed from a tubular body (3) in which slides a rod (32). The other end of the telescopic arm is connected by means of a second hinge pin (22) to the center of the pair of spectacles or of the eye protection screen (20). The axis of the second hinge pin is also substantially horizontal and parallel to the wearer's forehead. The device further includes means for temporarily maintaining the open position of the hinge pins and the length and slant of the telescopic arm.

17 Claims, 4 Drawing Sheets

5,720,040

DEVICE FOR ATTACHING A PAIR OF SPECTACLES TO HEADGEAR

The present invention relates to a device for attaching a pair of spectacles or another eye protection screen to headgear such as a hat, cap, helmet or even to a sufficiently rigid head band. Headgear equipped with a pair of spectacles, for example sunglasses, is specially useful for distracted persons who often forget where they left their pair of glasses the last time, but always know where their cap is because of its greater visibility.

U.S. Pat. No. 1,473,013 shows, in FIGS. 9 and 10, a cap fitted on the underneath of its peak with a pair of spectacles pivotable between a vertical use position and a stored position underneath the peak. In the use position, each lens can also be turned by 90° to lie parallel to the nose so that, if needed, only the right or left lens can be used. In this arrangement, there is thus only one degree of freedom:rotation about a horizontal axis parallel to the wearer's forehead to adjust the position of these spectacles relative to the face, which is quite insufficient bearing in mind the diversity of morphologies and the many different ways of wearing a hat.

EP 0 412 737 discloses a head band fitted with a peak underneath which is fitted a notched slide with dove-tailed lateral edges for receiving a support piece for a pair of spectacles. More specifically, this support piece is in the form of a downwardly-facing clip in which clips the bridge of a pair of spectacles. In this arrangement, there is only a single degree of freedom:moving the spectacles forwards or backwards to adjust the spectacles relative to the face. Moreover, if the wearer only wants to use the peak momentarily, it is necessary to remove the spectacles from the clip which, upon repeated removal, loses its gripping efficiency and eventually becomes useless.

EP 0 321 617 discloses a cap provided with a peak whose underneath is also fitted with a slide in which is slidably mounted for rearward sliding movement a support piece for a horizontal bar 23 parallel to the middle of the bridge of a pair of spectacles. By means of this arrangement, this pair of spectacles can be lifted up under the peak and additionally can be adjusted forwardly and rearwardly relative to the face. However, maintaining the desired more-or-less vertical position depends solely on simple friction between the horizontal bar and its housing in the support piece. In other words, when the dimensions of this housing increase as a result of use, this pair of spectacles rapidly becomes shaky.

Above all, in these three described arrangements, there is no provision for heightwise adjustment between the pair of spectacles and the headgear, which is disadvantageous for persons whose forehead is higher or lower than average. This absence of heightwise adjustment is also a drawback for those who desire to be able to permanently modify how far forward or back they wear their peak while at the same time wishing to keep their pair of spectacles close to their eyes.

FR-E-66 810 discloses a peakless helmet having a vertical mount formed by a slide, an upright with a braking device for limiting sliding, and a rotule on which the forks of a telescopic rod grip. The opposite end of the rod supports a second rotule on which a pair of spectacles is articulated. It is thus possible to set the spectacles to the eyes' height by adjusting the support along the slide and/or along the telescopic rod.

However, a rotule is an articulation formed from a spherical part able to turn in a hollow housing within a cone at the summit, usually by an angle of the order of 150°. So, in this case, there is one degree of freedom too much, namely a possible lateral movement with the pair of spectacles no longer centered relative to the nose. Moreover, the telescopic rod does not have any rotation prevention means, which in practice necessitates the use of two lateral mounts which is expensive to make and is less easy to adjust.

DE 2 030 546 shows a pair of spectacles attached to the peak of a building-site helmet by two lateral uprights each upper end of which is connected to a hook by means of a horizontal bolt permitting a first rotation, and each lower end of which is connected to the spectacle rim by a horizontal tenon permitting a second rotation. A device for height adjustment is provided due to the fact that the tenons holding the pair of spectacles in the uprights can move inside a vertical oblong aperture provided inside each upright. This device is however feasible only if the uprights are lateral so that the pair of spectacles does not interfere with the uprights when the spectacles are fitted. Moreover, the range of angular movements is limited, and the means for holding the spectacles in an angular position are particularly complicated.

The object of the present invention is a simplified device for attaching a pair of spectacles, or an eye protection screen, to a headgear or to a rigid head band, which device enables an easier and a more exact adjustment of the position of this pair of spectacles in front of the eyes whatever may be the position of the headgear on the head. It is thus desirable for the parts of this device to have a great mobility relative to one another in order to provide a wide range of adjustment forwards and backwards, in inclination and heightwise, in an easy way.

Once these positional adjustments have been carried out, this device should moreover itself ensure a sufficiently rigid and reliable locking in the final position without requiring additional complicated operations.

Of course, this attachment device must maintain its solidity so that it does not break even after multiple manipulations. It would moreover be desirable for this attachment device to allow a degree of interchangeability of the spectacles at the wearer's wish. Lastly, the component parts must be of a sufficiently simple design to permit mass production at low cost, notably by injection molding a thermohardenable material.

These aims are achieved due to the fact that the first hinge is extended by a single telescopic arm formed of a tubular body in which slides a rod whose other end is connected by a second hinge to the center of the pair of spectacles or to the protection screen, this second hinge also having its axis substantially horizontal and parallel to the wearer's forehead, this device further comprising means for temporarily holding the hinges in their angular position as well as the length and the angular orientation of the telescopic arm.

According to a first embodiment, the means for temporarily holding the angular position of a hinge is provided by gripping of a female hinge member in the form of two parallel plates about a pin forming a male hinge member at the end of the pivoting part.

According to a second embodiment, the means for temporarily holding the angular position of a hinge is provided by lateral shoulders of the male hinge member disposed over and covering the edges of the female hinge member thus forming a large frictional zone which can be improved if desired by a series of notches.

According to a third embodiment, the means for temporarily holding the angular position of a hinge comprises a series of embossments provided on the lateral faces of the male hinge member, which embossments come to engage in corresponding hollows provided in the inside lateral walls of branches of the female hinge member, or vice versa the hollows being provided on the lateral faces of the male hinge member. In this embodiment, the angular position is thus indexed, for example by steps of 10°, but proves to provide a somewhat firmer grip than in the preceding embodiment.

According to a fourth embodiment, the means for temporarily holding the angular position of a hinge is provided by the hinge pin one threaded end of which is engaged in a threaded opening of one of the branches of the female hinge member, and the other end of which has a head bearing against the outer face of the other branch of the female hinge member, this head having a shape enabling it to be turned manually or being fitted with a butterfly nut. This embodiment of hinge takes slightly longer to manipulate, but it however enables a very precise adjustment of the angular position and thereafter provides a particularly rigid grip.

Usefully the means for temporarily holding the length of the telescopic arm comprises one or several embossments provided on the sliding rod, which embossments come to engage in openings provided in the corresponding wall of the hollow tubular body. It will be noted that, apart from the possibility of step-by-step adjustment and a sufficiently rigid grip, this type of connection also permits interchanging of the glasses by fully withdrawing the rod from the body and inserting the rod of the next pair of spectacles.

The means for holding the angular position of the telescopic arm, i.e. the rotational position relative to the longitudinal axis of the telescopic arm, may comprise a longitudinal groove in the internal section of the tubular body in which groove a pin of the sliding rod engages. This means for holding the angular position of the telescopic arm may be more directly provided thanks to a rectangular or polygonal section of the sliding rod and of the internal section of the hollow tubular body.

When this device is applied to a hat or a cap comprising a large front peak, the first hinge can be attached underneath the peak adjacent its front edge and the second hinge is then attached to the front face of the pair of spectacles or protection screen adjacent its upper edge. These attachments may be permanent, such as by gluing or stitching, or preferably removable in the form of clips. The clip of the lower hinge can be complemented by one or several internal embossments engaging in openings provided in the upper edge of the spectacles. Preferably, the upper and lower hinges then have an angular displacement greater than 120°. By means of this arrangement with two hinges, the pair of spectacles can always be folded away very easily even when starting from a particularly advanced position.

When the device is applied to peakless headgear such as a cyclists', motorcyclists' or other helmet, or when it is applied to a simple head band, the first hinge may be attached to the middle of the headgear or head band by a hinge whose base is substantially vertical, the second hinge being attached to the rear face of the spectacles or the protective screen adjacent its upper edge. The hinges thus have an angular displacement comprised between 200° and 260°. It is thus possible to completely lift up the pair of spectacles against the front face of the headgear, or bring them exactly in front of the eyes. In this embodiment, the tubular body of the telescopic arm can be completed on either side also by screens which provide complete protection of the eyes.

The invention will be well understood from reading embodiments given by way of non-limiting examples and illustrated in the accompanying drawings, in which.

Figure 1:
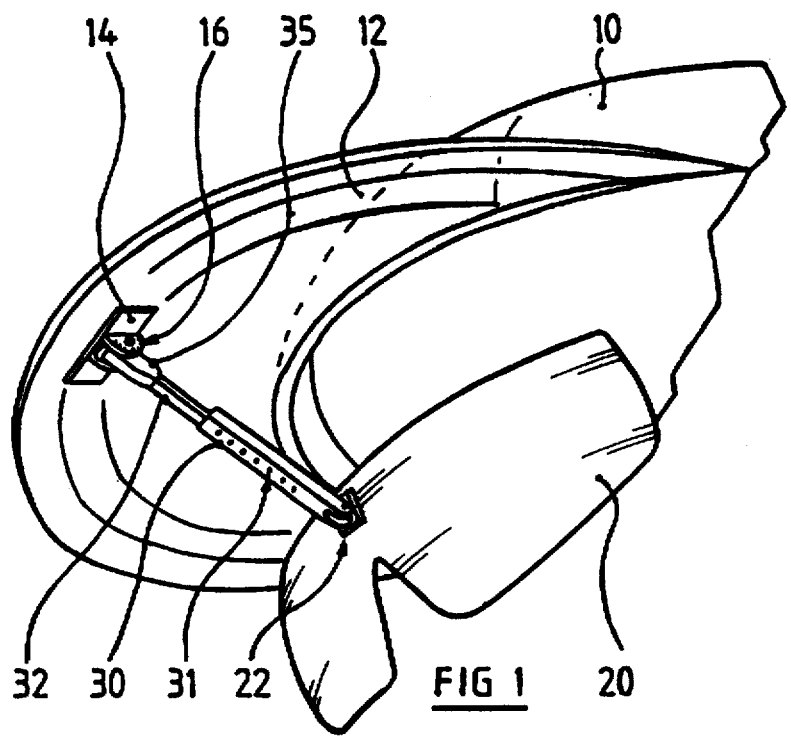
FIGS. 1 and 2 are perspective views of a first embodiment applied to a cap having a peak, the pair of spectacles being respectively in the use position and in the retracted position.
Figure 2:
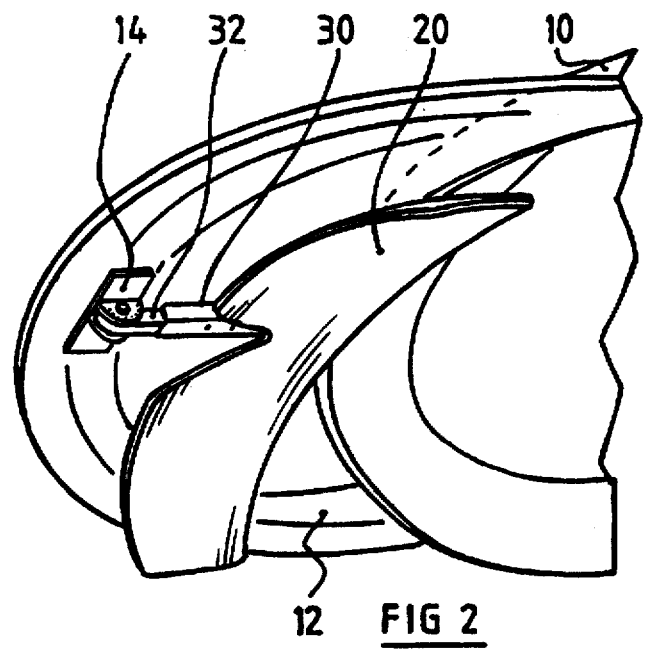

FIGS. 1 and 2 show a cap 10 fitted with a peak 12 seen from below. Under the peak 12, a one-piece pair of spectacles 20 is attached by means of a securing device comprising: an upper hinge 14 secured under the peak 12, a telescopic arm composed of a tubular body 30 in which a rod 32 is slidably mounted, and a lower hinge 22 connecting the pair of spectacles 20 to the end of the telescopic arm.

Figure 7:
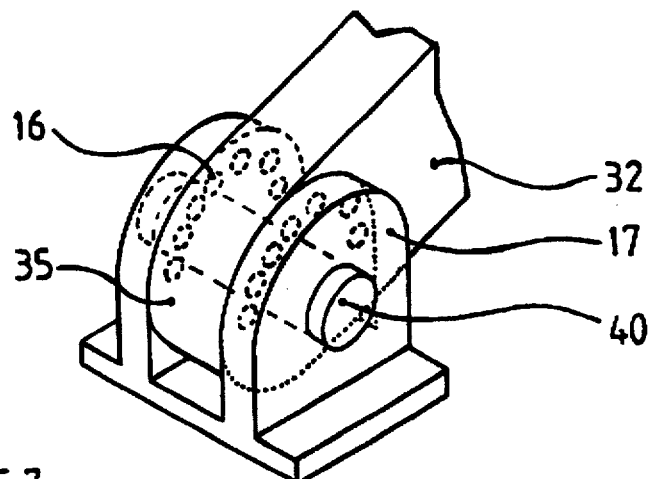
FIGS. 7, 8 and 9 respectively show three additional embodiments of hinges.

The hinge's base may either be directly glued to the peak 12 or incorporated therein and sewn in when the cap is made. This hinge 14 is preferably of the type shown in FIG. 7 wherein a male hinge member 35 has a series of arcuately-arranged embossments 16 which engage in corresponding recesses on the inner faces of the arms of a female hinge member 17. The male hinge member 35 and the female hinge member 17 are connected simply by a pin 40.

Figure 9:
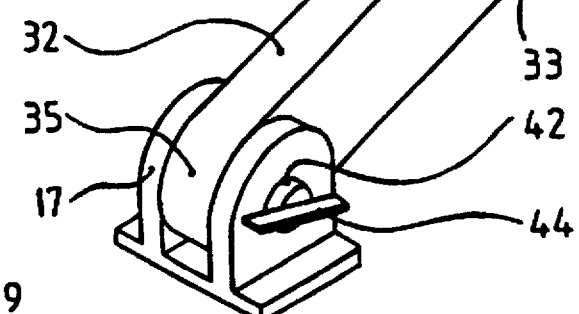

As can best be seen in the upper part of FIG. 9, the sliding rod 32 has a rectangular cross-section and its end carries a pair of studs 33 designed to engage in openings 31 provided in the corresponding face of the tubular body 30 which is also rectangular.

In this embodiment, the lower hinge 22 is directly glued onto the front face of the spectacles 20 adjacent the upper edge thereof.

Figure 3:
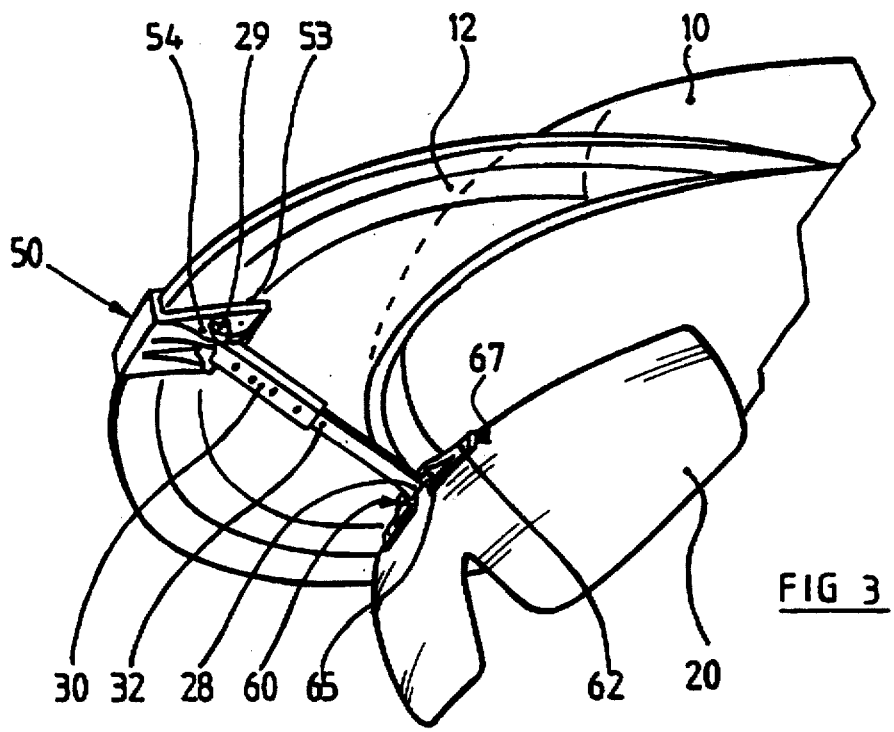
FIG. 3 is a perspective view of a second embodiment applied to a cap having a peak.

FIG. 3 illustrates a second embodiment which is distinguished in that the two hinges 50 and 60 simultaneously constitute clips for securing the attachment device at one end to the peak 12 and at the other end to the pair of spectacles 20.

Figure 4:
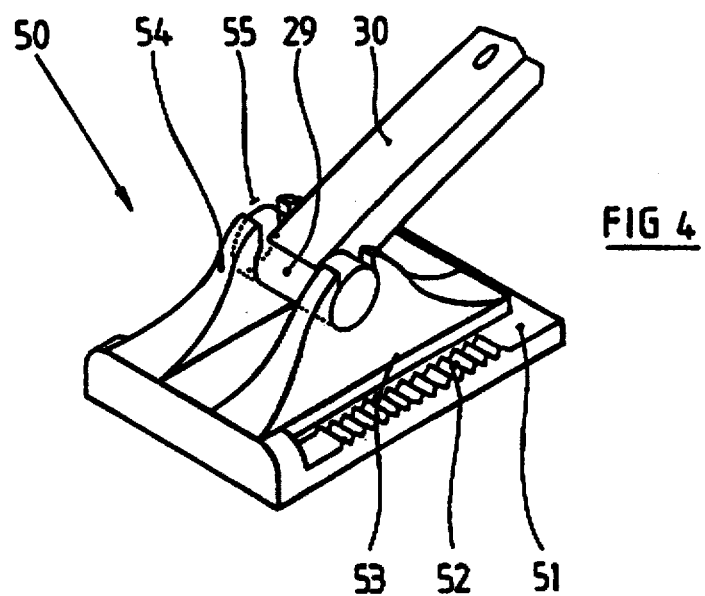
FIG. 4 is an enlarged perspective view of a hinge/clip used in the embodiment of FIG. 3.

As is more particularly shown in FIG. 4, the upper hinge/clip 50 comprises two relatively large gripping parts 51 and 53 either or both of which may be provided on their facing surfaces with peak-gripping teeth 52. The large size of these parts 51, 53 of the clip, of the order of 2.5×3.5 cm, provides an effective gripping on the rigid surface of the peak.

Part 53* constitutes the base of the female hinge member which in this case is in the form of two adjacent, parallel gripping parts (or forks) 54. A pin 29 integral with the end of the tubular body 30 can be force fitted in central space 55. This pin initially has a diameter which is 5 to 15% bigger than the diameter of the central space 55 of the female hinge member hence producing sufficient functional forces to hold the parts stationery relative to one another while allowing manual adjustment when desired. To reduce weight, the part 51 (which does not serve to support any other part) can have a hollow center so it forms a loop.

* 52 is an obvious mistake in the French text.

In like manner, the lower hinge 60 has on either side two upwardly-opening housings 65 for receiving a pin 28 at the end of rod 32 with a force fit. This hinge has a relatively long curved body comprising a clip-forming groove 67 which engages on the upper edge of the pair of spectacles 20. If desired, gripping is reinforced by an arrangement of embossments 62 inside the groove 67 which penetrate in corresponding openings in the edge of the spectacles. One of the principal advantages of this second hinge/clip is that the user can remove the mount and fit another one of different shape or color whenever desired, which is appreciable for fashion-dictated objects like sunglasses.

The wearer normally places the cap 10 on his head with the pair of spectacles 20 in the retracted position shown in FIG. 2. Once the cap is well positioned, the wearer lowers the pair of spectacles 20 to a substantially vertical position which involves a simultaneous rotation of the upper and lower hinges 14/50 and 22/60 which eases the overall movement. Then, with the hinge 14/50 held in one hand and the body 30 of the telescopic arm held in the other hand, the wearer may easily adjust the length of the telescopic arm to bring the pair of spectacles 20 exactly into the desired position more or less close to the eyes. The engagement of the studs 33 with the telescopic arm and the frictional forces produced in the hinges suffice to permanently hold the pair of spectacles 20 in the desired position. If the wearer changes the position of the cap on his head, for instance because of a modification in the environmental lighting conditions, if suffices for him to adjust only the angular position of the upper of lower hinge or the length of the arm, as appropriate.

Figure 5:
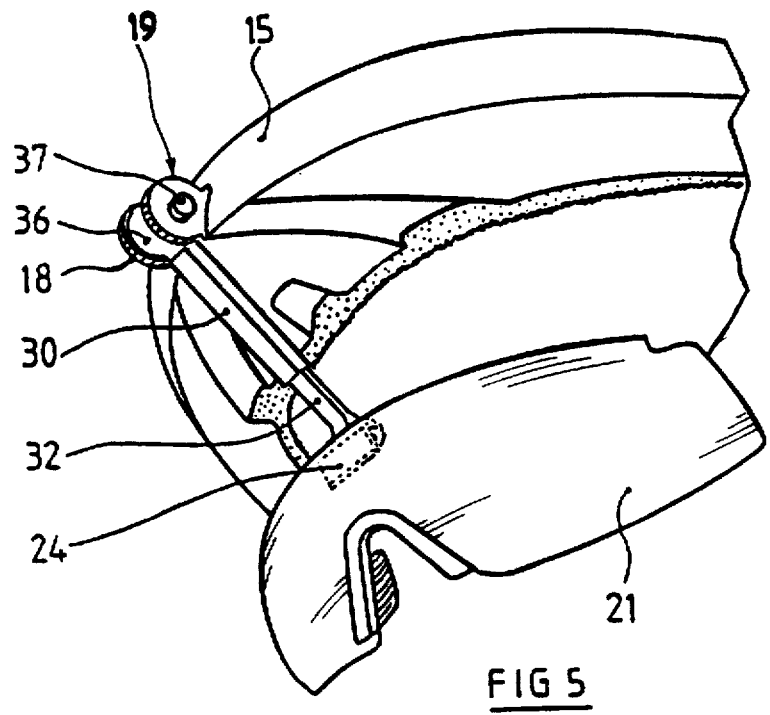
FIGS. 5 and 6 are perspective views of a third embodiment applied to a peakless helmet, the pair of spectacles respectively being in a folded down use position and a folded up storage position.
Figure 6:
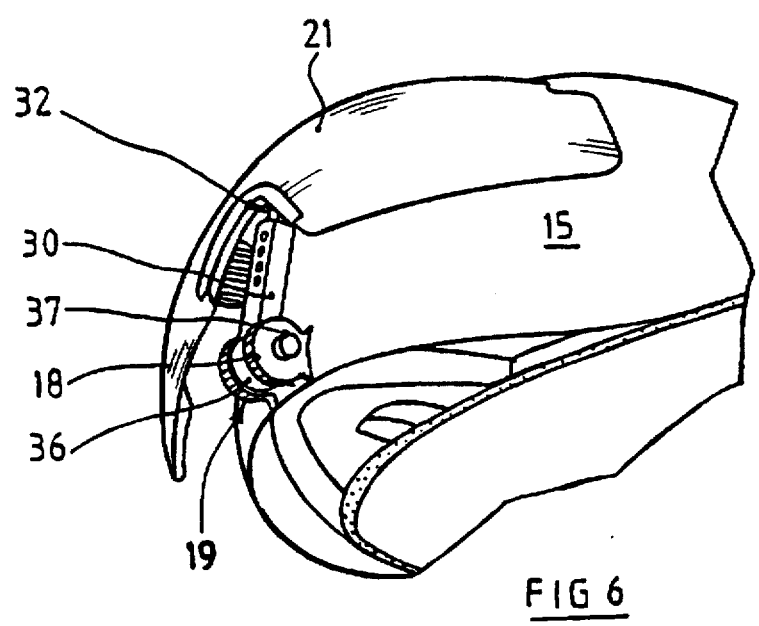

In the embodiment applied to a helmet 15 as shown in FIGS. 5 and 6, the tubular body 30 is directly connected to the upper hinge 19 whereas the sliding rod 32 is connected to the lower hinge 24. The base of the female hinge member 18 of this upper hinge 19 is fixed vertically against the helmet by adhesive or by screwing. Moreover, the connecting pin 37 is spaced sufficiently from the base to allow the male hinge 36 an angular displacement though 0° to 240°.

Figure 8:
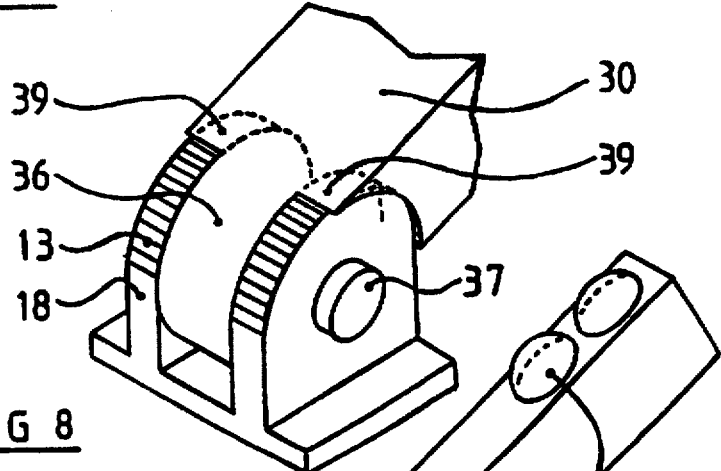

As is best shown in FIG. 8, this male hinge member 36 comprises on either side two shoulders 39 which cover the edges of the branches of the female hinge member 18. Initially, the radius of the arcuate part of these branches of the female hinge member 18 is slightly greater than the radius of the arcuate parts of the shoulders 39 so that during fitting of the pin 37 through the hinge members, an effective frictional force is created in the zone of overlap. It is also possible to provide small notches 13 on the periphery of the female hinge members 18 to consolidate the friction fit.

In this embodiment, the lower hinge 24 also has an angular displacement through about 240° and is fixed to the rear side of the pair of spectacles 21 adjacent its upper edge.

By means of this arrangement, as can be seen in FIG. 6, the pair of spectacles 21 can be folded up completely above the front part of the helmet, thus completely out of the wearer's field of sight when desired.

To place the glasses in front of the eyes, the wearer simply seizes them in the raised position to bring them in front of the eyes by a circular movement, with the front side of the spectacles permanently remaining facing forwards, by means of the simultaneous double rotation of the upper and lower hinges 19 and 24. As before, the positioning of the spectacles can be exactly set by a rapid adjustment of the length of the telescopic arm.

If desired, the upper hinge can be replaced by the hinge shown in FIG. 9 wherein the pin 42 comprises a threaded end engaged in a threaded orifice of the left hand part of the female hinge member, a head at the other end coming to bear against the outer face of the right hand part of the same hinge member 17. Hence, by turning this pin 42, for example by means of a fitted butterfly nut 44, the branches of the female hinge members are forcibly gripped against the male hinge member 35.

The parts making up the attachement device, namely the female or male hinges fitted on the headgear or on the pair of spectacles, the tubular body and the telescopic arm's sliding rod are advantageously made by injection molding synthetic material, notably plastics materials such as polypropylene of various colors. This molding technique is advantageous since it enables parts of relatively complex shapes to be made at very reasonable cost, and wherein slight dimensional imprecisions can easily be compensated.

By the same manufacturing technique, it is also possible to envisage fitting the tubular body of the telescopic arm with complementary solar screens on either side thereby further improving protection of the eyes. It is also possible to envisage a spectacle support which folds in two about a median vertical axis extending from the hinge to the nose-support pads, with a toothed-wheel device ensuring symmetrical opening. Many improvements can be made to the attachment device within the scope of the invention.

I claim:
1. An apparatus, comprising:
   a pair of spectacles;
   a headgear;
   a device for attaching the pair of spectacles and the headgear; and
   the device comprising:
      a central upper hinge having a first axis, the axis being substantially horizontal and parallel to the wearer's forehead, the central upper hinge being attached to the headgear;
      a central lower hinge having a second axis, the axis being substantially horizontal and parallel to the wearer's forehead, the central lower hinge being attached to a center of the pair of spectacles;
      a single telescopic arm including a tubular body and a rod which telescopically slides along the tubular body, the arm being pivotally connected to the central upper hinge at a first end of the arm, the arm being pivotally connected to the central lower hinge at a second end of the arm, such that the central upper and lower hinges being positionable in a plurality of angular positions;
      means for temporarily holding a length of the telescopic arm including at least one embossment disposed on the rod and a plurality of openings disposed on a wall of the tubular body, said at least one embossment detachably engaging into one of the openings; and
      means for temporarily holding an angular position of the telescopic arm.

2. An apparatus according to claim 1, wherein the means for temporarily holding the angular position of the telescopic arm is provided by a rectangular section of the rod and an internal section of the tubular body, and the tubular body is a hollow tubular body.

3. An apparatus according to claim 1, wherein the means for temporarily holding the angular position of the telescopic arm is provided by a polygonal section of the rod and an internal section of the tubular body, and the tubular body is a hollow tubular body.

4. An apparatus according to claim 2, wherein the means for temporarily holding the angular position of the telescopic arm comprises a longitudinal groove in the internal section of the tubular body in which a pin of the rod engages.

5. An apparatus according to claim 3, wherein the means for temporarily holding the angular position of the telescopic arm comprises a longitudinal groove in the internal section of the tubular body in which a pin of the rod engages.

6. An apparatus according to claim 1, wherein the central upper hinge comprises a female hinge member having two substantially parallel forks and a male hinge member mounted on one end of the rod, the female hinge member has an opening defined by the forks, the male hinge member pivotally, engageably retaining in the opening of the female hinge member.

7. An apparatus according to claim 1, wherein the central upper hinge comprises a female hinge member having a plurality of notches, and a male hinge member having lateral shoulders and being mounted on one end of the rod, the apparatus further comprising means for temporarily holding an angular position of the central upper hinge, which is provided by the lateral shoulders of the male hinge member disposed over and covering one of the plurality of notches of the female hinge member thus forming a frictional zone between the lateral shoulders and the notch.

8. An apparatus according to claim 1, wherein the central upper hinge comprises a female hinge member having two branches and a male hinge member mounted on one end of the rod, the apparatus further comprising means for temporarily holding an angular position of the central upper hinge, which is provided by a hinge pin having a threaded end being engaged in a threaded opening of one of the two branches of the female hinge member, and by the other end of the hinge pin having a head bearing against an outer face of the other branch of the female hinge member, the head having a shape enabling the head to be turned manually.

9. An apparatus according to claim 1, wherein the central upper hinge comprises a female hinge member having two branches and a male hinge member mounted on one end of the rod, the apparatus further comprising means for temporarily holding an angular position of the central upper hinge, which is provided by a hinge pin having a threaded end being engaged in a threaded opening of one of the two branches of the female hinge member, and by the other end of the hinge pin having a head bearing against an outer face of the other branch of the female hinge member, the head having a shape enabling the head to be fitted with a butterfly nut.

10. An apparatus according to claim 1, wherein the headgear has a front peak, the central upper hinge includes clip means for attaching the central upper hinge adjacent to a front edge of the headgear underneath the front peak.

11. An apparatus according to claim 1, wherein the central lower hinge comprises clip means for attaching the central lower hinge to a front of the pair of spectacles adjacent to an upper edge thereof, the clip means includes at least one internal embossment engaging in a corresponding opening provided in the upper edge of the spectacles.

12. An apparatus, comprising:
an eye protection screen;
a headgear;
a device for attaching the eye protection screen to the headgear; and
the device comprising:
  a central upper hinge having a first axis, the axis being substantially horizontal and parallel to the wearer's forehead, the central upper hinge being attached to the headgear;
  a central lower hinge having a second axis, the axis being substantially horizontal and parallel to the wearer's forehead, the central lower hinge being attached to a center of the eye protection screen;
  a single telescopic arm including a tubular body and a rod which telescopically slides along the tubular body, the arm being pivotally connected to the central upper hinge at a first end of the arm, the arm being pivotally connected to the central lower hinge at a second end of the arm, such that the central upper and lower hinges being positionable in a plurality of angular positions;
  means for temporarily holding a length of the telescopic arm including at least one embossment disposed on the rod and a plurality of openings disposed on a wall of the tubular body, said at least one embossment detachably engaging into one of the openings; and
  means for temporarily holding an angular position of the telescopic arm.

13. An apparatus, comprising:
a pair of spectacles;
a head band;
a device for attaching the pair of spectacles to the head band; and
the device comprising:
  a central upper hinge having a first axis, the axis being substantially horizontal and parallel to the wearer's forehead, the central upper hinge being attached to the head band;
  a central lower hinge having a second axis, the axis being substantially horizontal and parallel to the wearer's forehead, the central lower hinge being attached to a center of the pair of spectacles;
  a single telescopic arm including a tubular body and a rod which telescopically slides along the tubular body, the arm being pivotally connected to the central upper hinge at a first end of the arm, the arm being pivotally connected to the central lower hinge at a second end of the arm, such that the central upper and lower hinges being positionable in a plurality of angular positions;
  means for temporarily holding a length of the telescopic arm including at least one embossment disposed on the rod and a plurality of openings disposed on a wall of the tubular body, said at least one embossment detachably engaging into one of the openings; and
  means for temporarily holding an angular position of the telescopic arm.

14. An apparatus, comprising:
an eye protection screen;
a head band;
a device for attaching the eye protection screen to the hand band; and
the device comprising:
  a central upper hinge having a first axis, the axis being substantially horizontal and parallel to the wearer's forehead, the central upper hinge being attached to the head band;
  a central lower hinge having a second axis, the axis being substantially horizontal and parallel to the wearer's forehead, the central lower hinge being attached to a center of the eye protection screen;
  a single telescopic arm including a tubular body and a rod which telescopically slides along the tubular body, the arm being pivotally connected to the central upper hinge at a first end of the arm, the arm being pivotally connected to the central lower hinge at a second end of the arm, such that the central upper and lower hinges being positionable in a plurality of angular positions;
  means for temporarily holding a length of the telescopic arm including at least one embossment disposed on the rod and a plurality of openings disposed on a wall of the tubular body, said at least one embossment detachably engaging into one of the openings; and means for temporarily holding an angular position of the telescopic arm.

15. An apparatus according to claim 13, wherein the central upper hinge is attached to a middle of the head band, the central upper hinge includes a female hinge member having a base, the base of the female hinge member is substantially vertical, the central lower hinge is attached to a rear face of the pair of spectacles adjacent an upper edge of the rear face, and the central upper and lower hinges have an angular displacement of about 240°.

16. An apparatus according to claim 14, wherein the central upper hinge is attached to a middle of the head band, the central upper hinge includes a female hinge member having a base, the base of the female hinge member is substantially vertical, the central lower hinge is attached to a rear face of the eye protection screen adjacent an upper edge of the rear face, and the central upper and lower hinges have an angular displacement of about 240°.

17. An apparatus, comprising:

a pair of spectacles;

a headgear;

a device for attaching the pair of spectacles to the headgear; and the device comprising:

a central upper hinge having a first axis, the axis being substantially horizontal and parallel to the wearer's forehead, the central upper hinge being attached to the headgear;

a central lower hinge having a second axis, the axis being substantially horizontal and parallel to the wearer's forehead, the central lower hinge being attached to a center of the pair of spectacles;

a single telescopic arm including a tubular body and a rod which telescopically slides along the tubular body, the arm being pivotally connected to the central upper hinge at a first end of the arm, the arm being pivotally connected to the central lower hinge at a second end of the arm; and wherein the central upper and lower hinges each comprises a female hinge member having two substantially parallel forks and a male hinge member mounted on one end of the rod, the female hinge member has an opening defined by the forks, the male hinge member pivotally, engageably retaining in the opening of the female hinge member, engagement fitting force between the female and male hinge members temporarily holding angular positions of the central upper and lower hinges.

* * * * *